US007703081B1

(12) United States Patent
Buches

(10) Patent No.: US 7,703,081 B1
(45) Date of Patent: Apr. 20, 2010

(54) FAST SYSTEM CALL HOOKING ON X86-64 BIT WINDOWS XP PLATFORMS

(75) Inventor: David M. Buches, Westlake Village, CA (US)

(73) Assignee: Symantec Corporation, Mountain View, CA (US)

(*) Notice: Subject to any disclaimer, the term of this patent is extended or adjusted under 35 U.S.C. 154(b) by 1245 days.

(21) Appl. No.: 11/234,478

(22) Filed: Sep. 22, 2005

(51) Int. Cl.
*G06F 9/44* (2006.01)
*G06F 11/00* (2006.01)
(52) U.S. Cl. .................... 717/127; 726/22; 714/35
(58) Field of Classification Search ......... 717/100–178; 718/100–108; 726/22–33; 714/35
See application file for complete search history.

(56) References Cited

U.S. PATENT DOCUMENTS

| 5,263,032 | A  | * | 11/1993 | Porter et al. ............... 714/764 |
| 7,284,276 | B2 | * | 10/2007 | Conover et al. ............... 726/26 |
| 7,287,283 | B1 | * | 10/2007 | Szor ............................. 726/26 |
| 7,441,042 | B1 | * | 10/2008 | Sallam ........................ 709/232 |
| 2006/0069662 | A1 | * | 3/2006 | Laborczfalvi et al. ........... 707/1 |
| 2007/0180257 | A1 | * | 8/2007 | Bae et al. ..................... 713/182 |

OTHER PUBLICATIONS

Tan, C., "Downloaded code of Win2K/XP SDT Restore 0.2 (Proof-of-Concept)", Oct. 9, 2004, Version 0.2. Retrieved from Internet at URL: http://www.security.org.sg/code/SDTrestore-0.2.zip.*

Russinovich, M. and Solomon, D., "Microsoft Windows Internals, Fourth Edition: Microsoft Windows Server 2003, Windows XP, and Windows 2000", 4th Ed., 2005, Microsoft Press, pp. 119-124.
Schreiber, S., "Undocumented Windows 2000 Secrets: A Programmer's Cookbook", Jul. 2001, Addison-Wesley, pp. 265-330.
Tan, C., "Defeating Kernel Native API Hookers by Direct Service Dispatch Table Restoration", Jul. 8, 2004 (updated Oct. 3, 2004), pp. 1-12 [online]. Retrieved from the Internet at <URL:http://www.security.org.sg/code/SIG2_DefeatingNativeAPIHookers.pdf>.
Tan, C., "Win2K/XP SDT Restore 0.2 (Proof-Of-Concept)", Jul. 6, 2004 (updated Oct. 9, 2004), pp. 1-4 [online]. Retrieved from the Internet at <URL:http://www.security.org.sg/code/sdtrestore.html>.

* cited by examiner

*Primary Examiner*—Wei Y Zhen
*Assistant Examiner*—Chung Cheng
(74) *Attorney, Agent, or Firm*—Gunnison, McKay & Hodgson, L.L.P.; Forrest Gunnison

(57) ABSTRACT

A new system service table is dynamically generated to allow dynamic insertion of code between the caller of a native operating system function, in user or kernel mode, and the operating system's implementation of the native operating system function. The dynamically inserted code has full access to the function parameters, such as arguments. The new system service table has encoded values that are relative to the base address of the new system service table and which include the function addresses of the native operating system functions corresponding to original system service table entries in the original system service table.

18 Claims, 8 Drawing Sheets

FAST SYSTEM CALL HOOKING ON X86-64 BIT WINDOWS XP PLATFORMS

BACKGROUND OF THE INVENTION

1. Field of the Invention

The present invention relates to computer systems. More particularly, the present invention relates to hooking operating system functions.

2. Description of Related Art

The x86-64 bit Windows XP operating system exposes native OS (operating system) functions using a Fast System Call mechanism supported by a native application program interface (API) termed the ZwAPI. The Fast System Call mechanism allows code to be written that quickly transitions from user mode to kernel mode.

SUMMARY OF THE INVENTION

In accordance with one embodiment, a method includes dynamically generating a new system service table in a computer system. Currently running program threads are located on said computer system. An original system service table thread value is replaced in each of the currently running program threads with a new system service table thread value, such that the currently running program threads utilize the new system service table to call operating system functions rather than an original system service table. A first hook is installed in said new system service table such that calls from the currently running program threads to a native operating system function, which creates a child program thread, such as ZwCreateThread, are directed to a thread modification code. One or more second hook(s) are installed on one or more selected operating system function in the new system service table such that a call to the one or more selected operating system functions are redirected to an alternate code, such as computer security code.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
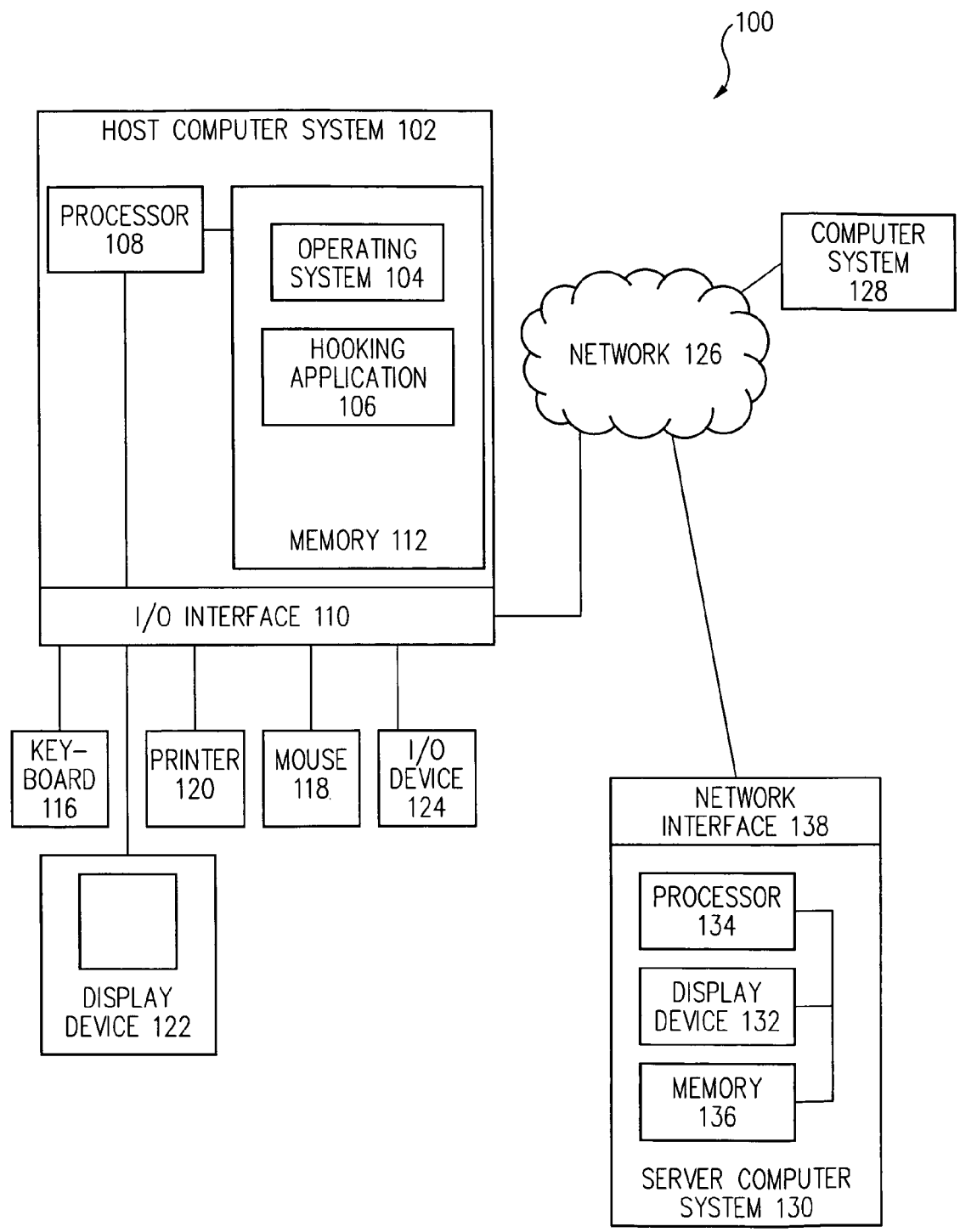
FIG. 1 is a diagram of a client-server system that includes a hooking application executing on a host computer system in accordance with one embodiment of the present invention.

User mode applications operating in 32 bit and 64 bit Windows operating systems request native operating system functions, also termed system services, by calling APIs exported by various DLLs (dynamically linked libraries). In particular, a native API, in which command names typically begin with "Nt", is provided to user-mode programs by the library ntdll.dll.

An export table in ntdll.dll also makes the native operating system functions accessible through the Fast System Call mechanism using a native API commonly termed the ZwAPI. Herein native operating system functions accessible through the Fast System Call mechanisms using the ZwAPI are termed ZwAPI functions. Command names in the ZwAPI typically begin with "Zw", for example, ZwCreateThread. The ZwAPI serves as the interface between code executing in user mode space and the native operating system functions that execute in the more privileged kernel mode and are not directly accessible from user mode, i.e., ZwAPI functions.

Instruction code, also termed an instruction stream, located in ntdll.dll for a selected ZwAPI command is executed to pass control to the appropriate ZwAPI function that services the call. In particular, the instruction code located in ntdll.dll passes control to the kernel mode of the operating system, commonly termed trapping to kernel mode. The kernel mode of the operating system, commonly referred to as NtOSKRNL, locates a specific system service table and a specific system service table entry in the system service table that provides the location of the ZwAPI function in memory.

In 32 bit and 64 bit Windows operating systems the instructions for exported ZwAPI functions, in both NtOSKRNL and ntdll.dll, include the following format:

mov eax, wSrvID; service ID
    lea edx, [esp] [4]; pointer to parameters where wSrvID is the service ID.

The service ID is a 16 bit word. The upper four (4) bits, i.e., bits 0 to 3, represent a table ID (identifier), and the remaining 12 bits, i.e., bits 4 to 15, represent a table index.

The table ID, i.e., bits 0 to 3, is used by the operating system to locate a base address in a system service descriptor table (SSDT) of a corresponding system service table (SST). Herein a system service descriptor table is the operating system structure that stores the base address of different system service tables utilized by the operating system. In particular, the system service descriptor table stores the base address of the table that supports native operating system functions callable using the ZwAPI. Herein this system service table is termed Table 0.

The remaining 12 bits, i.e., bits 4 to 15, represent a table index which is an offset from the base address of the indicated system service table at which is located a 32 bit system service table entry.

The system service table entry is a 32 bit value that is used by the operating system, NtOSKRNL, to locate and call the selected native operating system function. In 32 bit Windows operating systems, the 32 bit system service table entry is typically a function address represented as a straight function address pointer in the form: p table, base, sum, table index, which corresponds to the address of the native operating system function in memory.

In 32 bit Windows operating systems, some applications, such as computer security applications, often hook calls made to operating system functions by replacing the original 32 bit system service table entry with hooking code, such as a function pointer to alternate code. For example, an existing 32 bit Windows system service table entry, which is a straight function address pointer to the address of an operating system function, is retrieved, stored off, and a new function pointer is injected into the system service table at that location which transfers control to alternate code. Frequently, the alternate code executes a procedure and determines whether to return to the call with an error, or invoke the operating system function.

In x86-64 bit Windows XP operating systems, however, a 32 bit system service table entry does not represent the function address as a straight function address pointer in the form: p table, base, sum, table index, as the environment is 64 bit based rather than 32 bit based, i.e., a 64 bit straight function address pointer is too large to fit in a 32 bit space. Instead, different from 32 bit Windows operating systems, in x86-64 bit Windows XP operating systems, a system service table entry is a 32 bit encoded value that is used by the operating system to compute a function address. Encoded within each 32 bit system service table entry is the number of stack arguments that need to be copied from the user to the kernel mode stack, herein termed a stack argument count value, and a signed offset to a native operating system function.

In particular in x86-64 bit Windows operating systems, the lower 4 bits of the 32 bit system service table entry, i.e., bits 0 to 3, specify the number of arguments to be copied from the user to the kernel mode stack, i.e., the stack argument count value, which is the total number of function arguments minus four (4) because the first four arguments are placed in general purpose registers. The remaining upper 28 bits, i.e., bits 4 to 31, represent a signed offset to the function to be called relative to the base address of the system service table being used.

To compute the address of the function being called in x86-64 bit Windows operating systems, and since ZwAPI services are implemented in the kernel, the signed offset, i.e., bits 4 to 31, is extracted and added to the base address of the system service table being used. Consequently, user applications needing to hook a function address in an x86-64 bit Windows XP operating system can no longer simply replace the 32 bit system service table entry with a straight function address pointer to alternate code.

Embodiments in accordance with the present invention dynamically generate a new system service table to allow dynamic insertion of code between the caller of a native operating system function, in user or kernel mode, and the operating system's implementation of the native operating system function. The dynamically inserted code has full access to the function parameters, such as arguments. The new system service table has encoded values that are relative to the base address of the new system service table and which include the function addresses of the native operating system functions corresponding to original system service table entries in the original system service table.

Figure 2:
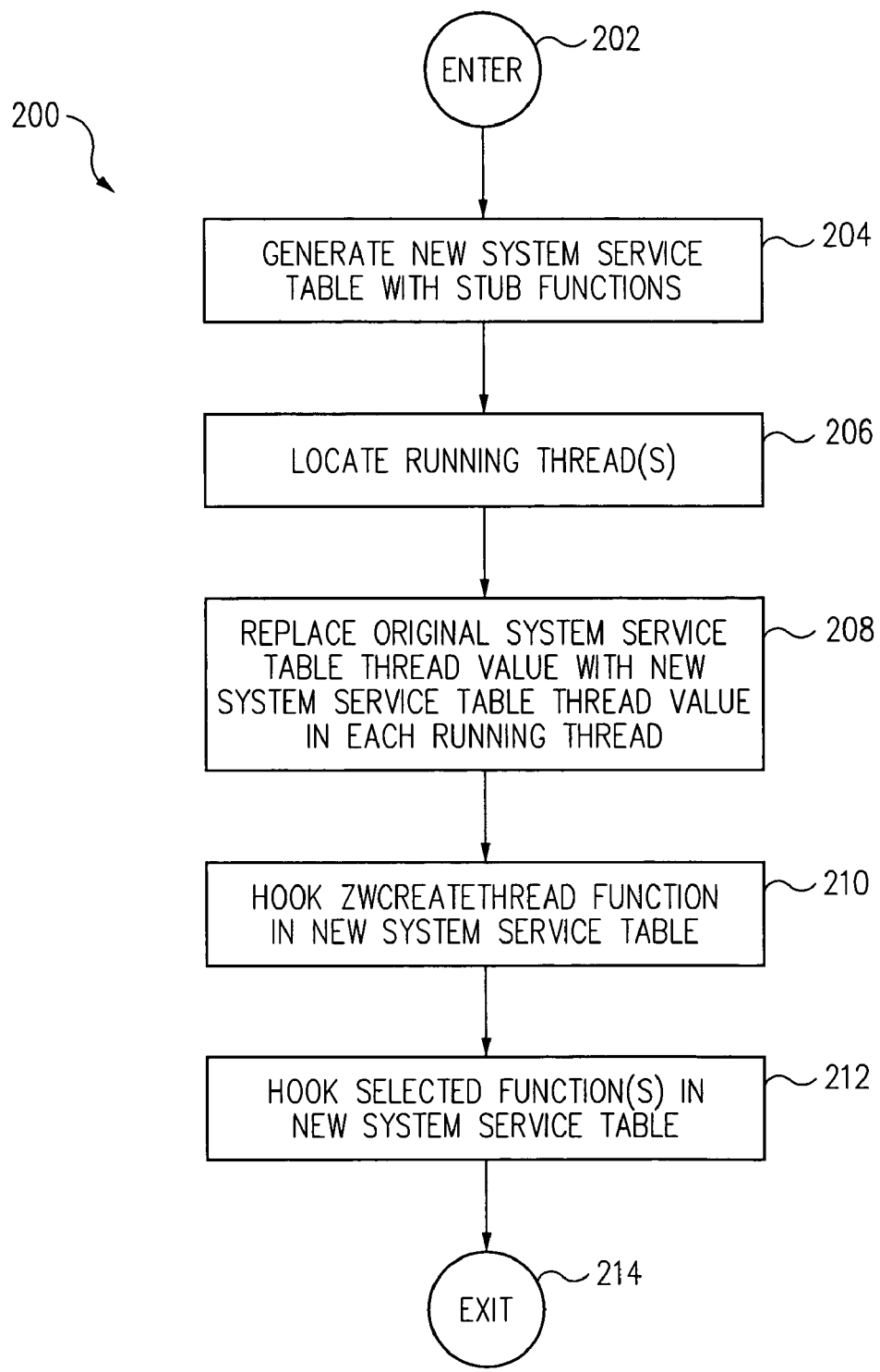
FIG. 2 illustrates a flow diagram of a method implemented by hooking application in accordance with one embodiment of the invention.

Referring generally to FIG. 2, in one embodiment, a method includes dynamically generating a new system service table with stub functions having function addresses of ZwAPI functions (operation 204). Program threads, herein also termed simply threads, currently running on the computer system are located (operation 206). For each currently executing thread, an original system service table thread value located in the kernel Kthread structure for the thread is replaced with a new system service table thread value (operation 208). In this way, calls to ZwAPI functions issuing from the executing threads are routed through the new system service table rather than the original system service table. An entry in the new system service table corresponding to the ZwCreateThread function is hooked, such that calls to the ZwCreateThread function are directed to a thread modification code (operation 210). In one embodiment, the thread modification code calls the ZwCreateThread function and on return replaces the original system service table thread value with the new system service table thread value. In this way, threads created by the currently running threads, commonly termed child threads, are also routed through the new system service table rather than the original system service table. One or more selected ZwAPI functions can then be hooked in the new system service table so that calls to the selected ZwAPI functions are redirected to alternate code (operation 212). In some embodiments, the alternate code is computer security code that determines whether malicious code activity is indicated.

Embodiments in accordance with the invention, permit native operating system functions used in the x86-64 bit Windows XP operating system exposed via the Fast System Call method to be hooked in a dynamically generated new system service table and redirected to alternate code.

Herein, in one embodiment, malicious code is defined as any computer program, module, set of modules, or code that enters a computer system environment without an authorized user's knowledge and/or without an authorized user's consent. A computer virus is one example of a malicious code. Further, herein, in one embodiment, malicious code activity is any indication of malicious code.

FIG. 1 is a diagram of a client-server system 100 that includes a hooking application 106 executing on a host computer system 102 in accordance with one embodiment of the present invention. Host computer system 102, can be a stand-alone computer system, such as a personal computer or workstation, as illustrated in FIG. 1. Host computer system 102, e.g., a first computer system, can also be part of a client-server configuration that is also illustrated in FIG. 1 in which computer system 102 interacts with a server computer system 130, e.g., a second computer system, via a network 126. Network 126 can be any network or network system that is of interest to a user, for example, the Internet.

Hooking application 106 is described herein as executed on host computer system 102, however, in light of this disclosure, those of skill in the art can understand that the description is applicable to a client-server system as well. Host computer system 102 typically includes a central processing unit (CPU) 108, hereinafter processor 108, an input/output (I/O) interface 110, an operating system 104, and a memory 112.

Host computer system 102 may further include standard devices, such as a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, memory 112 includes a main memory, as well as any supplemental memories, and includes executable areas, data storage areas, and any memory areas needed by host computer system 102.

In one embodiment, hooking application 106 is loaded into host computer system 102 via I/O device 124, such as from a CD, DVD or floppy disk containing hooking application 106.

In other embodiments, such as client-server embodiments, hooking application 106 can be downloaded into host computer system 102 from server computer system 130 via network 126. Server computer system 130 can further include: a network interface 138 for communicating with network 126; a memory 136; a processor 134; and, a display device 132. In various embodiments, network interface 138 and I/O interface 110 include analog modems, digital modems, or a network interface card.

In FIG. 1, host computer system 102 is also coupled to a computer system 128, by network 126, from which malicious code may be received, such as via a file containing malicious code. In one embodiment, computer system 128 is similar to host computer system 102, for example, includes a central processing unit, an input/output (I/O) interface and a memory. Computer system 128 may further include standard devices like a keyboard, a mouse, a printer, a display device, and an I/O device(s). The various hardware components of computer system 128 are not illustrated to avoid detracting from the principles of the invention.

In the present embodiment, hooking application 106 is stored in memory 112 of host computer system 102 and executed on host computer system 102. The particular type and configuration of host computer system 102, server computer system 130, and computer system 128 are not essential to this embodiment of the present invention.

FIG. 2 illustrates a flow diagram of a method 200 implemented by hooking application 106 in accordance with one embodiment of the invention. In various embodiments, hooking application 106 can be implemented independently or as part of another application, such as a host intrusion detection system (RIDS) application. Referring now to FIGS. 1 and 2 together, in one embodiment, execution of hooking application 106 by processor 108 results in the operations of method 200 as described below. Method 200 is entered at an ENTER operation 202, and from ENTER operation 202, processing transitions to a GENERATE NEW SYSTEM SERVICE TABLE WITH STUB FUNCTIONS operation 204.

In GENERATE NEW SYSTEM SERVICE TABLE WITH STUB FUNCTIONS operation 204, a new system service table with stub functions is dynamically generated. In one embodiment, the new system service table is dynamically generated with new system service table entries that each corresponds to a separate original system service table entry in an original system service table. In the present embodiment, the original system service table supports execution of native operating system functions callable by API commands, such as ZwAPI commands.

In one embodiment, each new system service table entry includes a stack argument count value from a corresponding original system service table entry, i.e., bits 0 to 3, and an offset to a generated stub function, herein termed a stub offset. In one embodiment, a stub function includes a small amount of code and a function address. In the present embodiment, the function address is represented as a function address pointer that is a straight function address pointer that indicates the actual function address of a corresponding ZwAPI function in memory. In one embodiment, the actual function address is calculated using the signed offset present in the corresponding original system service table entry. Generation of a new system service table with stub functions is further described herein with reference to FIG. 3 and method 300.

From GENERATE NEW SYSTEM SERVICE TABLE WITH STUB FUNCTIONS operation 204, processing transitions to a LOCATE RUNNING THREAD(S) operation 206. In LOCATE RUNNING THREAD(S) operation 206, program thread(s) currently running, e.g., currently executing, in the computer system are located. In one embodiment, currently running threads are enumerated, for example using a system call that enumerates running threads in the operating system, such as _Kthread.

The identifier of each thread is obtained and a pointer to each thread is retrieved. In one embodiment, each thread is identified in the Kthread block utilized by the kernel of the operating system. Locating running threads in a computer system is well known to those of skill in the art and is not further described to avoid detracting from the principles of the invention.

From LOCATE RUNNING THREAD(S) operation 206, processing transitions to a REPLACE ORIGINAL SYSTEM SERVICE TABLE THREAD VALUE WITH NEW SYSTEM SERVICE TABLE THREAD VALUE IN EACH RUNNING THREAD operation 208. In REPLACE ORIGINAL SYSTEM SERVICE TABLE THREAD VALUE WITH NEW SYSTEM SERVICE TABLE THREAD VALUE IN EACH RUNNING THREAD operation 208, an original system service table thread value that identifies the location of the original system service table is replaced with a new system service table thread value that identifies the location of the new system service table.

In one embodiment, a reference is taken on an identified running thread indicating a Kthread structure associated with the thread in the operating system. The Kthread structure includes a number of fields, one of which identifies the system service table utilized by the thread, herein termed the system service table field.

A system service table field in the Kthread structure includes a system service table thread value that is a pointer to the location of the system service table utilized by the thread. Herein a system service table thread value that points to an original system service table is termed an original system service table thread value, and a system service table thread value that points to a new system service table is termed herein the new system service table thread value. In the present embodiment, the original system service table thread value in each running thread is replaced with a new system service table thread value that points to the location of the new system service table generated in operation 204.

For example, in one embodiment, a _KTHREAD::SYSTEMCALLTABLE value, i.e., an original system service table thread value, in a thread is replaced with a _KTHREAD::NEWSYSTEMCALLTABLE value, i.e., a new system service table thread value, identifying the location of the new system service table.

Thus, in the present embodiment, calls to ZwAPI functions issuing from running threads are now routed to the new system service table rather than the original system service table. The new system service table in turn routes the calls to corresponding ZwAPI functions.

From REPLACE ORIGINAL SYSTEM SERVICE TABLE THREAD VALUE WITH NEW SYSTEM SERVICE TABLE THREAD VALUE IN EACH RUNNING THREAD operation 208, processing transitions to a HOOK ZWCREATETHREAD FUNCTION IN NEW SYSTEM SERVICE TABLE operation 210. In HOOK ZW CREATETHREAD FUNCTION IN NEW SYSTEM SERVICE TABLE operation 210, an entry in the new system service table corresponding to the ZwCreateThread function, herein termed the ZwCreateThread new system service table entry, is hooked so that calls are redirected to a thread modification code, i.e., a first hook.

In one embodiment, the function address of the Zw CreateThread function found in the stub function associated with the ZwCreateThread new system service table entry is replaced with a pointer to the thread modification code. In one embodiment, the thread modification code issues the call to the ZwCreateThread function and on return replaces an original system service table thread value in the returned child thread structure with a new system service table thread value that points to the new system service table. In this way, child threads created by currently running threads, if any, are modified to utilize the new system service table rather than the original system service table.

From HOOK ZWCREATETHREAD FUNCTION IN NEW SYSTEM SERVICE TABLE operation 210, processing transitions to a HOOK SELECTED FUNCTION(S) IN NEW SYSTEM SERVICE TABLE operation 212. In HOOK SELECTED FUNCTION(S) IN NEW SYSTEM SERVICE TABLE operation 212, one or more selected ZwAPI function(s) are hooked in the new system service table, i.e., a second hook. As the new system service table includes the function addresses of corresponding ZwAPI functions in memory, rather than signed offsets as in the original system service table, various applications can more efficiently hook into desired processes. Thus, in one embodiment, hooking application 106 further includes code for hooking selected ZwAPI functions in the new system service table. Hooking of functions in the new system service table is further described herein with reference to FIG. 4.

From HOOK SELECTED FUNCTION(S) IN NEW SYSTEM SERVICE TABLE operation 212, processing transitions to an EXIT operation 214, with processing exiting method 200.

In an alternate embodiment, hooking application 106 performs operations 204, 206, 208, and 210 and then exits method 200, allowing other applications to hook ZwAPI functions in the new system service table as needed. Thus, in this alternate embodiment, operation 212 is performed by other applications after hooking application 106 has performed operations 204, 206, 208, and 210.

Figure 3:
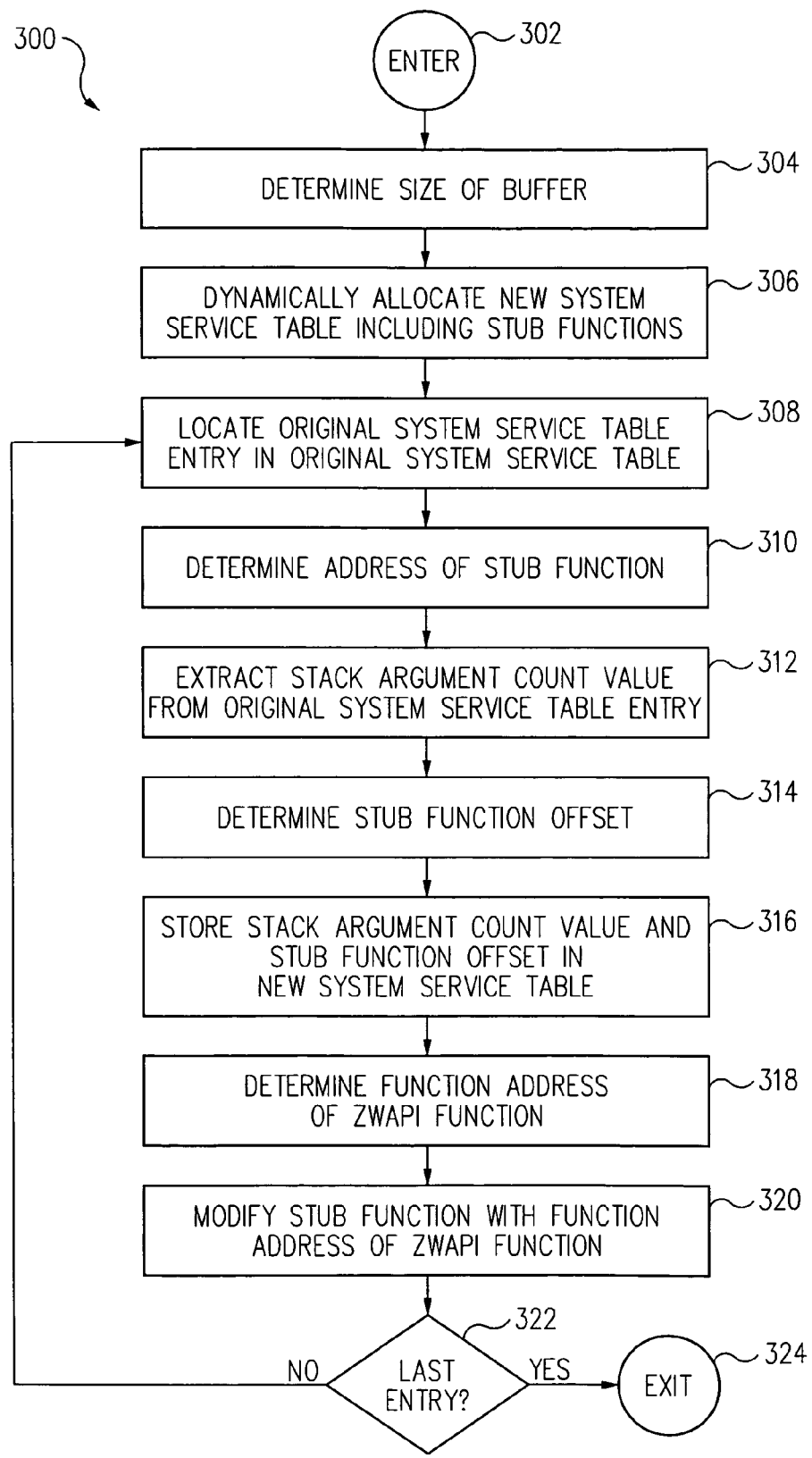
FIG. 3 illustrates a flow diagram of a method for generating a new system service table with stub functions in accordance with one embodiment of the invention.

FIG. 3 illustrates a flow diagram of a method 300 for generating a new system service table with stub functions in accordance with one embodiment of the invention. Referring now to FIG. 3, in one embodiment, execution of hooking application 106 by processor 108 results in the operations of method 300 as described below. Method 300 is entered at an ENTER operation 302, and from ENTER operation 302, processing transitions to a DETERMINE SIZE OF BUFFER operation 304.

In DETERMINE SIZE OF BUFFER operation 304, the amount of memory to dynamically allocate for the new system service table and stub function(s) is determined. In one embodiment, the amount of memory to dynamically allocate for the new system service table and stub function(s) equals the sum of the total size of the new system service table entries, the total size of the stub functions, and the total size of padding added to ensure each stub function begins on a 16 byte boundary, if any.

In one embodiment, the total size of the new system service table entries is determined by multiplying the number of new system service table entries by the size of each new system service table entry. In one embodiment, the number of new system service table entries is the same as the number of original system service table entries. In one embodiment the number of new system service table entries is determined from the limit value found in the limit value field of the original system service table, for example the limit field in the array at KeServiceDescriptorTable.base[0].

In accordance with the x86-64 bit Windows XP operating system, the size of an original system service table entry is 4 bytes, i.e., 32 bits. Thus, the total size of the new system service table entries is the product of the number of new system service table entries multiplied by 4 bytes, i.e., 32 bits.

In one embodiment, the total size of the stub functions is determined by multiplying the number of stub functions, which is equal to the number of new system service table entries, by the size of each stub function, for example, 16 bytes, i.e., 128 bits. In one embodiment, the total size of padding added to the stub functions is the total sum of padding added to each of the stub functions to place each on a 16 byte boundary.

Thus, for example, if the number of new system service table entries is 10 and each new system service table entry size is 4 bytes, the total size of the new system service table entries is 40 bytes, e.g., 10 new system service table entries×4 bytes per new system service entry. Assuming 10 stub functions are used, e.g., one stub function per table entry, and each stub function is 16 bytes, the total size of the stub functions is 160 bytes, e.g., 10 stub functions x16 bytes per stub function. Assuming no padding is needed to place each stub function on a 16 byte boundary, the total size of padding is zero. Thus, in the present example, a sum of 200 bytes, i.e., the sum of 40 bytes added to 160 bytes, should be allocated for the new system service table with stub functions.

From DETERMINE SIZE OF BUFFER operation 304, processing transitions to a DYNAMICALLY ALLOCATE NEW SYSTEM SERVICE TABLE INCLUDING STUB FUNCTIONS operation 306. In DYNAMICALLY ALLOCATE NEW SYSTEM SERVICE TABLE INCLUDING STUB FUNCTIONS operation 306, memory is dynamically allocated to store the new system service table including the stub functions. In one embodiment, the new system service table including the stub functions is allocated in the non-paged pool of memory on the host computer, e.g., host computer system 102.

In one embodiment, the base address of the new system service table is the starting address of the buffer in memory. In other embodiments, the base address can be differently set. In one embodiment, the new system service table includes two parts: an array of 4 byte, i.e., 32 bit, encoded values, that are the new system service table entries, and stub functions corresponding to each of the new system service table entries in the array.

As further described herein, in one embodiment, each 4 byte new system service table entry in the new system service table includes two pieces of information: the lower four (4) bits, i.e., bits 0 to 3, specify the number of arguments that are to be copied from the caller's stack, i.e., the stack argument count value, obtained from a corresponding original system service table entry; and the remaining bits, i.e., bits 4 to 31, are a signed offset to the corresponding stub function to be called relative to the base address of the new system service table itself.

In one embodiment, a stub function is code that directs a call to a function address. Thus, in one embodiment, a stub function includes instruction code and a function address of a ZwAPI function. In one embodiment the function address is represented as a function address pointer.

In one embodiment, a stub function is located within +/−2 GB of the base address of the new system service table, e.g., the range of a 32 bit signed value. In one embodiment each stub function is 16 bytes.

In one embodiment, a stub function has the form:

| MOV RAX, functionAddress | ;Move function address to RAX |
|---|---|
| JMP RAX | ;unconditional jump to RAX |
| NOP | ;padding to next paragraph. |
| NOP | ; |
| NOP | ; |
| NOP | ; |
| NOP | ; |

Thus, in the above embodiment, a stub function includes a jump, e.g., JMP, to a function address so that modifications are not made to the stack. Further, each stub function is generated to lie on a 16 byte boundary, e.g., paragraph.

From DYNAMICALLY ALLOCATE NEW SYSTEM SERVICE TABLE INCLUDING STUB FUNCTIONS operation 306, processing transitions to a LOCATE ORIGINAL SYSTEM SERVICE TABLE ENTRY IN ORIGINAL SYSTEM SERVICE TABLE operation 308. In LOCATE ORIGINAL SYSTEM SERVICE TABLE ENTRY IN ORIGINAL SYSTEM SERVICE TABLE operation 308, a first non-zero entry, e.g., a 32 bit entry, is located in the original system service table. For example, in one embodiment, a first original system service table entry is located using the service ID corresponding to a first ZwAPI function in either ntdll.dll or NtOSKRNL.

From LOCATE ORIGINAL SYSTEM SERVICE TABLE ENTRY IN ORIGINAL SYSTEM SERVICE TABLE operation 308, processing transitions to a DETERMINE ADDRESS OF STUB FUNCTION operation 310. In DETERMINE ADDRESS OF STUB FUNCTION operation 310, the address of a stub function is computed. For example, in one embodiment, the address of a stub function is calculated by adding the amount of bytes allocated to the new system service table entries and any preceding allocated stub functions to the base address of the new system service table.

From DETERMINE ADDRESS OF STUB FUNCTION operation 310, processing transitions to an EXTRACT STACK ARGUMENT COUNT VALUE FROM ORIGINAL SYSTEM SERVICE TABLE ENTRY operation 312. In EXTRACT STACK ARGUMENT COUNT VALUE FROM ORIGINAL. SYSTEM SERVICE TABLE ENTRY operation 312, the stack argument count value is extracted from the original system service table entry in the original system service table. In one embodiment, the stack argument count value is bits 0 to 3 of the 32 bit original system service table entry.

From EXTRACT STACK ARGUMENT COUNT VALUE FROM ORIGINAL SYSTEM SERVICE TABLE ENTRY operation 312, processing transitions to a DETERMINE STUB FUNCTION OFFSET operation 314. In DETERMINE STUB FUNCTION OFFSET operation 314, the offset of the stub function from the base address of the new system service table is computed. For example, in one embodiment, the starting location of the buffer is set as the base address of the new system service table and the address of the stub function is subtracted from the base address of the new system service table to obtain the offset of the stub function. In one embodiment, the offset of the stub function is a signed offset.

From DETERMINE STUB FUNCTION OFFSET operation 314, processing transitions to a STORE STACK ARGUMENT COUNT VALUE AND STUB FUNCTION OFFSET IN NEW SYSTEM SERVICE TABLE operation 316. In STORE STACK ARGUMENT COUNT VALUE AND STUB FUNCTION OFFSET IN NEW SYSTEM SERVICE TABLE operation 316, the stack argument count value, obtained in operation 312, and the stub function offset, computed in operation 314, are together stored as a new system service table entry in the new system service table.

Thus, the new system service table entry in the new system service table includes the original stack argument count value represented by bits 0 to 3 and the stub function offset to the corresponding stub function represented as bits 4 to 31.

From STORE STACK ARGUMENT COUNT VALUE AND STUB FUNCTION OFFSET IN NEW SYSTEM SERVICE TABLE operation 316, processing transitions to a DETERMINE FUNCTION ADDRESS OF ZWAPI FUNCTION operation 318. In DETERMINE FUNCTION ADDRESS OF ZWAPI FUNCTION operation 318, the function address of the corresponding ZwAPI function in memory is calculated from bits 4 to 31 of the original system service table entry.

For example, in one embodiment, to obtain the function address of a ZwAPI function in memory, bits 4 to 31 of the corresponding original system service table entry are added to the base address of the original system service table. In one embodiment, the resultant function address of the ZwAPI function is a 64 bit address, i.e., 8 byte address.

From DETERMINE FUNCTION ADDRESS OF ZWAPI FUNCTION operation 318, processing transitions to a MODIFY STUB FUNCTION WITH FUNCTION ADDRESS OF ZWAPI FUNCTION operation 320. In MODIFY STUB FUNCTION WITH FUNCTION ADDRESS OF ZWAPI FUNCTION operation 320, the stub function is updated with the function address calculated in operation 318. Herein the term function address is the actual address of a function in memory, and is represented as a function address pointer that indicates the actual location of a ZwAPI function in memory.

Thus, calls made to a ZwAPI function using a ZwAPI command are directed to a corresponding new system service table entry in the new system service table. The stack argument count value is preserved in bits 0 to 3 of the new system service table entry, however, bits 4 to 31 are used to locate the address of a corresponding stub function relative the base address of the new system service table. When the stub function is invoked, the stub function code then calls the ZwAPI function at the function address calculated in operation 318. Notably, the function address of the ZwAPI function utilized by the new system service table is now in an address form that can be stored off and efficiently replaced with hooking code if so desired, as earlier described with reference to method 200 and FIG. 2.

From MODIFY STUB FUNCTION WITH FUNCTION ADDRESS OF ZWAPI FUNCTION operation 320, processing transitions to a LAST ENTRY check operation 322. In LAST ENTRY check operation 322, a determination is made whether the original system service table entry located in operation 308, is the last original system service table entry in the original system service table. In particular, whether next new system service table entry service table corresponding to a next original system service table entry needs to be generated. If the original system service table entry located in operation 308 is not the last original system service table entry ("NO"), processing returns to operation 308, with an address of a next original system service table entry being located. Otherwise, if the original system service table entry located in operation 308 is the last original system service table entry ("YES"), processing transitions from LAST ENTRY check operation 322 to EXIT operation 324 with processing exiting method 300.

Figure 4:
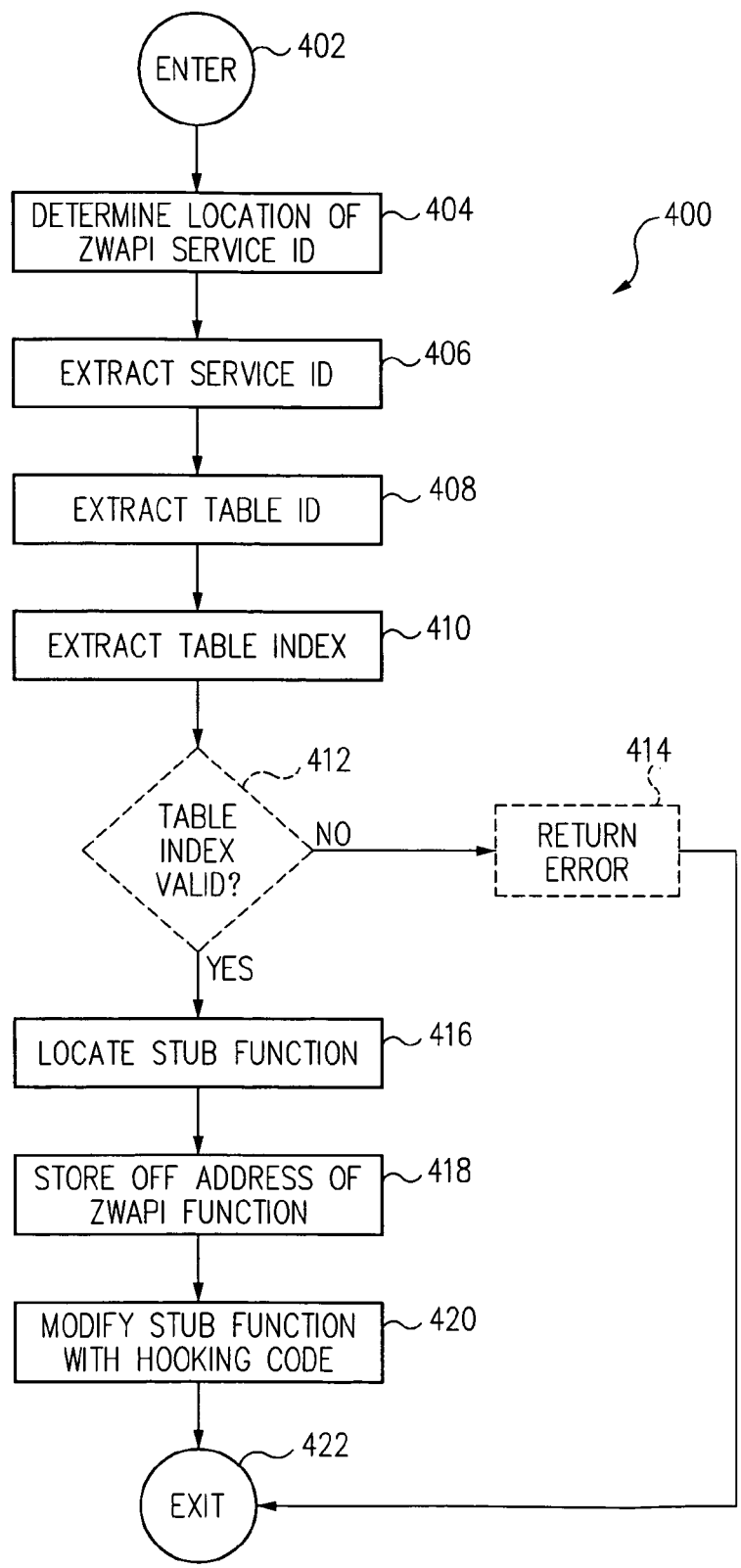
FIG. 4 illustrates a flow diagram of a method for hooking a selected ZwAPI function in a new system service table in accordance with one embodiment of the invention.

FIG. 4 illustrates a flow diagram of a method 400 for hooking a selected ZwAPI function in a new system service table in accordance with one embodiment of the invention. In the present embodiment, method 400 is used for hooking the ZwCreateThread function in operation 210 (FIG. 2) and as well as one or more selected ZwAPI function(s) in operation 212 (FIG. 2).

Referring now to FIG. 4, in one embodiment, execution of hooking application 106 by processor 108 results in the operations of method 400 as described below. Method 400 is entered at an ENTER operation 402, and from ENTER operation 402, processing transitions to a DETERMINE LOCATION OF ZWAPI FUNCTION SERVICE ID operation 404. In DETERMINE LOCATION OF ZWAPI SERVICE ID operation 404, the location of a selected ZwAPI function service ID corresponding to a ZwAPI function to be hooked in the new system service table, is located, for example, in ntdll.dll or in NtOSKRNL.

In one embodiment, the address of the ZwAPI service ID in ntdll.dll or NtOSKRNL is located by calling GetNtDll/GetNTOSServiceAddress. Recall that the corresponding entry in ntdll.dll provides an instruction stream including a 16 bit service ID that corresponds to a selected ZwAPI function.

From DETERMINE LOCATION OF ZWAPI SERVICE ID operation 404, processing transitions to an EXTRACT SERVICE ID operation 406. In EXTRACT SERVICE ID operation 406, the service ID is extracted, for example, from the instruction stream present at the entry in ntdll.dll corresponding to the selected ZwAPI function. In one embodiment, the instruction stream present at the address returned in operation 404 is accessed and the 16 bit constant that is being moved into the eax register, i.e., the service ID, is extracted. As earlier described, the service ID includes a 4 bit table ID and a 12 bit table index.

From EXTRACT SERVICE ID operation 406, processing transitions to an EXTRACT TABLE ID operation 408. In EXTRACT TABLE ID operation 408, the table ID is extracted from the service ID. In one embodiment, the table ID, i.e., bits 0 to 3, is extracted from the service ID obtained in operation 406. As earlier described, the table ID identifies the location an entry in the system service descriptor table having the base address of a corresponding system service table that supports the selected ZwAPI function. From EXTRACT TABLE ID operation 408, processing transitions to an EXTRACT TABLE INDEX operation 410.

In EXTRACT TABLE INDEX operation 410, the table index is extracted from the service ID. In one embodiment, the table index, i.e., bits 4 to 15, is extracted from the service ID obtained in operation 406. As earlier described, the table index is an offset into the system service table identified by the table ID at which a 32 bit system service table entry is located.

From EXTRACT TABLE INDEX operation 410, processing transitions to an optional TABLE INDEX VALID check operation 412, or directly to a LOCATE STUB FUNCTION operation 416, if optional TABLE INDEX VALID check operation 412 is not performed. In optional TABLE INDEX VALID check operation 412, a determination is made whether the table index is a valid value. In one embodiment, a determination is made whether or not the table index obtained in operation 410 is an offset within an address range, e.g., minimum/maximum address locations, allocated to the new system service table.

If the table index is not an offset within the address range of the new system service table, the table index is determined to be invalid ("NO"), and processing transitions from optional TABLE INDEX VALID check operation 412 to an optional RETURN ERROR operation 414, or directly to EXIT operation 422 if optional RETURN ERROR operation 414 is not performed. In optional RETURN ERROR operation 414 an error message is returned to a user or logged to a data structure, for example, that the table index for the selected ZwAPI function is invalid. From RETURN ERROR operation 414, processing transitions to an EXIT operation 422, with processing exiting method 400.

Referring again to optional TABLE INDEX VALID check operation 412, alternatively, if the table index is an offset within the address range of the new system service table, the table index is determined to be valid ("YES"), and processing transitions from optional TABLE INDEX VALID check operation 412 to LOCATE STUB FUNCTION operation 416.

In LOCATE STUB FUNCTION operation 416, the stub function generated in the new system service table that corresponds to the called ZwAPI function is located in the new system service table. For example, if the location of the called function is entry five (5) in the original system service table, then the corresponding location of the function in the new system service table is entry five in the new system service table. As earlier described, the function entry in the new system service table contains the stub offset to the corresponding stub function, i.e., contains the stub offset to the location of the corresponding stub function.

From LOCATE STUB FUNCTION operation 416, processing transitions to a STORE OFF FUNCTION ADDRESS OF ZWAPI FUNCTION operation 418. In STORE OFF FUNCTION ADDRESS OF ZWAPI FUNCTION operation 418, the function address to the ZwAPI function, located in the stub function, i.e., in the stub function instruction stream, is stored off, such as to a memory structure accessible by hooking application 106.

From STORE OFF FUNCTION ADDRESS OF ZWAPI FUNCTION operation 418, processing transitions to a MODIFY STUB FUNCTION WITH HOOKING CODE operation 420. In MODIFY STUB FUNCTION WITH HOOKING CODE operation 420, the instruction stream of the stub function is modified with hooking code, e.g., a hook procedure. In one embodiment, the function address, e.g., "functionAddress" calculated in operation 318 (FIG. 3), i.e., the function address pointer, is replaced with a pointer to an address of alternate code. In this way, rather than a call proceeding to the function address of the ZwAPI function, the call is redirected in accordance with the hooking code.

For example, in one embodiment, in operation 210, the function address in the stub function corresponding to the ZwCreateThread function is replaced with hooking code that redirects call to the thread modification code. In one embodiment, the call is redirected on return from the call to allow the original system service table thread value to be replaced with the new system service table thread value.

In one embodiment, in operation 212, the function address in a stub function corresponding to a selected ZwAPI function is replaced with hooking code that redirects the call to the location of computer security code that performs a computer security related analysis, such as a virus check. In some embodiments, the hooking code is invoked prior to the call being made to the corresponding ZwAPI function, while in other embodiments, the hooking code is invoked on return from the call.

From MODIFY STUB FUNCTION WITH HOOKING CODE operation 420, processing transitions to EXIT operation 422 with processing exiting method 400.

Figure 5:
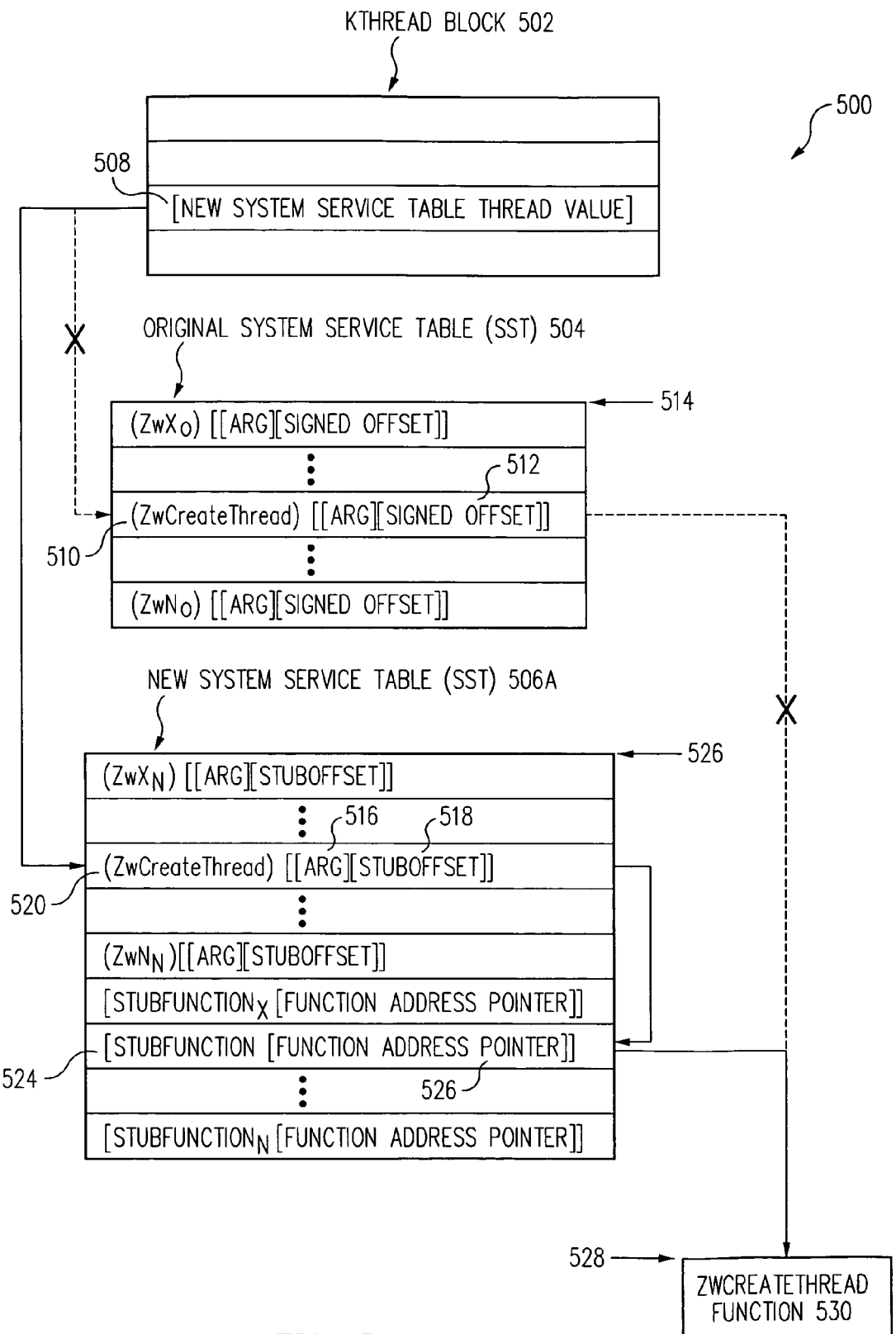
FIG. 5 illustrates a diagram of a currently running thread utilizing a new system service table thread value and a new system service table in accordance with one embodiment of the invention.
Figure 6:
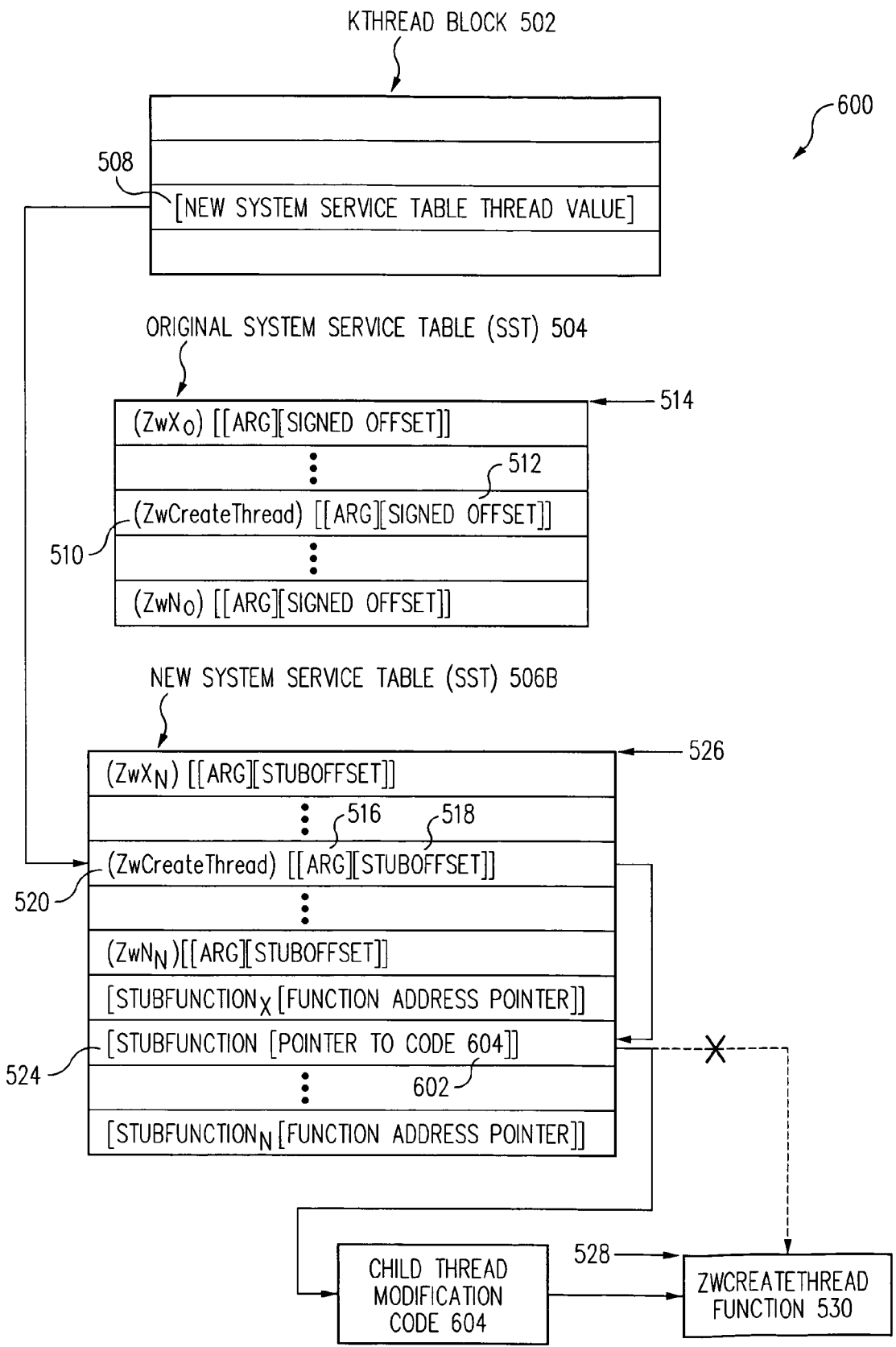
FIG. 6 illustrates a diagram of a new system service table in which calls to a ZwCreateThread function are hooked in accordance with one embodiment of the invention.
Figure 7:
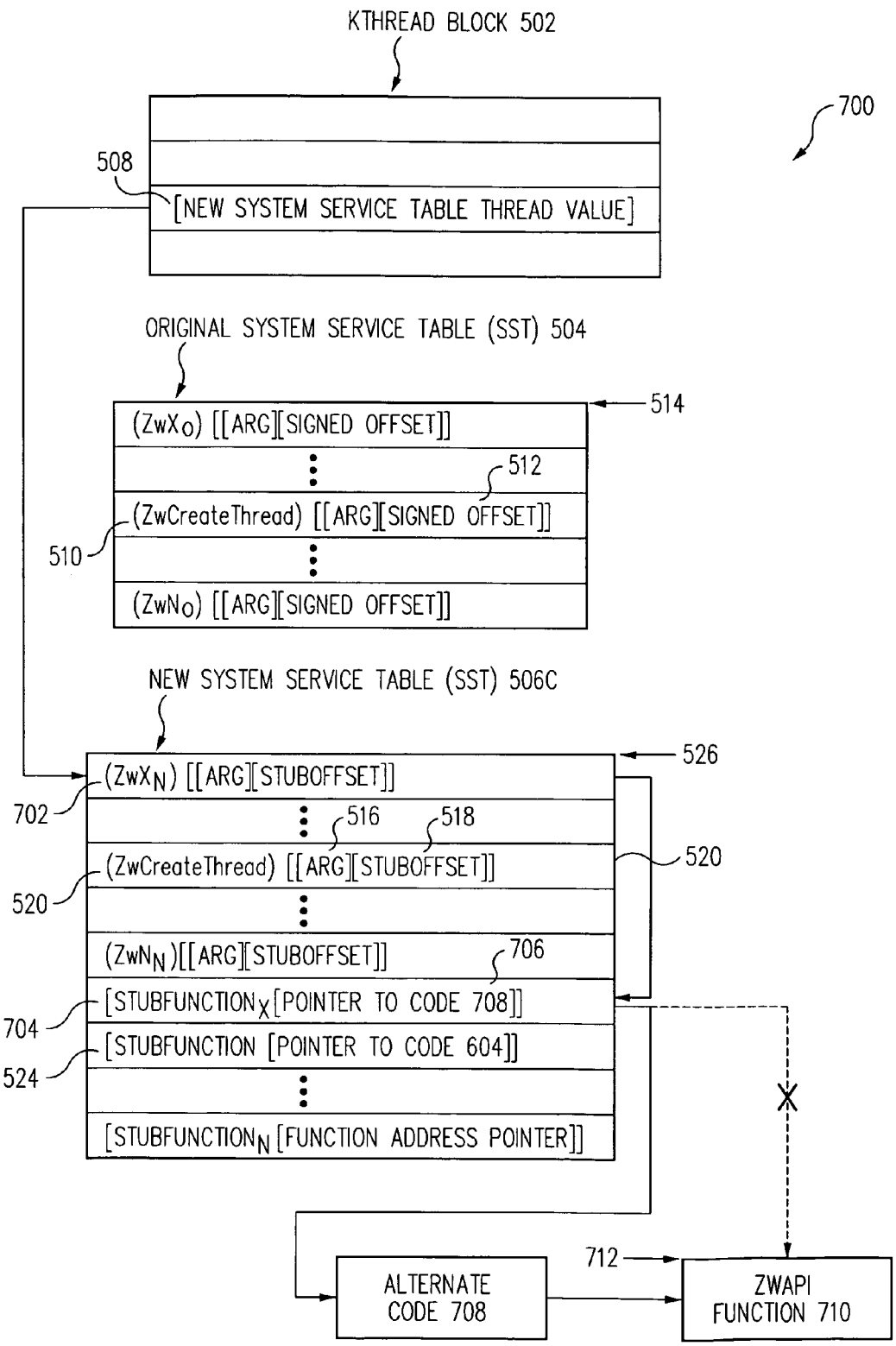
FIG. 7 illustrates a diagram of a new system service table in which a call to a selected ZwAPI function is hooked in accordance with one embodiment of the invention.

FIGS. 5, 6, and 7 together further illustrate the operations of method 200. In FIGS. 5, 6 and 7, a new system service table 506 is illustrated and described at various stages of method 200, and thus, is identified using the suffixes A, B, and C to indicate that the new system service table is changed.

FIG. 5 illustrates a diagram 500 of a currently running thread utilizing a new system service table thread value 508 and a new system service table 506A in accordance with one embodiment of the invention. Herein an "X" located over a dotted line indicates a by-passed execution path.

Referring now to FIGS. 1, 2, 3, 4 and 5 together, in one embodiment, initially new system service table 506A including new system service table entries $ZwX_N, \ldots, ZwN_N$ with corresponding stub functions $STUBFUNCTION_X, \ldots, STUBFUNCTION_N$ generated in accordance with operation 204 of method 200 (FIG. 2) and method 300 (FIG. 3). As illustrated, each new system service table entry $ZwX_N, \ldots, ZwN_N$ corresponds to an original system service table entry $ZwX_O, \ldots, ZwN_O$ in an original system service table 504.

Each new system service table entry includes a stack argument count value, "ARG", that is the same as the stack argument count value in a corresponding original system service table entry, e.g., "ARG", and a stub offset, e.g., "STUBOFFSET", that identifies the location of a corresponding stub function. As earlier described, in one embodiment, a stub offset is a signed offset to a corresponding stub function relative to the base address of the new system service table.

Each corresponding stub function includes a function address that identifies the location of a corresponding ZwAPI function in memory. In one embodiment, the function address is represented as a function address pointer that is a straight address pointer to the location of a corresponding ZwAPI function in memory, rather than a signed offset as found in the original system service table 504.

In FIG. 5, a currently running thread is represented in the operating system by Kthread block 502 in which an original system service table thread value (not shown) is replaced with new system service table thread value 508 in accordance with operations 206 and 208 of method 200 (FIG. 2). New system service table thread value 508 identifies, e.g., is a pointer to, the location of new system service table 506A rather than original system service table 504.

In particular, new system service table thread value 508 points to a base address 526 of new system service table 506A rather than a base address 514 of original system service table 504. In this way, the currently running thread utilizes new system service table 506A rather than original system service table 504. For example, in one embodiment, when calling the ZwCreateThread function, the table index value that identifies the offset of an original system service table entry for ZwCreateThread relative to base address 514 is used to locate a corresponding new system service table entry associated with the ZwCreateThread function in new system service table 506A, e.g., new system service table entry 520, relative to base address 526.

In the present embodiment, new system service table entry 520 includes a stack argument count value 516 and a stub offset 518 to a corresponding stub function 524. Stub function 524 includes a function address pointer 532 that indicates the location of the ZwCreateThread function 530 in memory, e.g., address 528. In one embodiment, as earlier described, stub function 524 includes an instruction stream, i.e., instruction code, that causes a jump to the address location identified by function address pointer 532 and the ZwCreateThread function 530 is called.

Thus, in FIG. 5, in one embodiment, following execution of operations 202, 204, 206 and 208 of method 200 (FIG. 2), currently running threads utilize new system service table 506A rather than original system service table 504 to call at ZwAPI functions using the function address pointers in the stub functions. As earlier described with reference to FIG. 3 and method 300, the function address pointers in the stub functions are now straight function address pointers to corresponding ZwAPI functions, rather than signed offsets, e.g., signed offset 512, as found in original system service table 504.

Although currently running threads utilize new system service table 506A, child threads created by currently running threads are generated by the operating system with the original system service table thread value (not shown) rather than new system service table thread value 508. Thus, as further described herein with reference to FIG. 6, in one embodiment, a new system service table entry corresponding to the ZwCreateThread function is hooked and newly created child threads are modified to include the new system service table thread value rather than the original system service table thread value.

FIG. 6 illustrates a diagram 600 of a new system service table 506B in which calls to a ZwCreateThread function are hooked in accordance with one embodiment of the invention. Referring to FIG. 6, in one embodiment, as earlier described with reference to operation 210 of method 200 (FIG. 2) and method 400 (FIG. 4), function address pointer 532 to ZwCreateThread function 530 (FIG. 5) is replaced with hooking code that redirects call execution to thread modification code 604 rather than to ZwCreateThread function 530. In one embodiment, function address pointer 532 (FIG. 5) is replaced with a pointer 602, i.e., "POINTER TO CODE 604", that indicates the location of thread modification code 604.

In one embodiment, when a call is received, thread modification code 604 issues the call to ZwCreateThread function 530, but on return replaces the original system service table thread value with new system service table thread value 508. In this way, child threads created by a currently running thread are modified to utilize new system service table 506B rather than original system service table 504.

In some embodiments, thread modification code 604 can further include computer security evaluation code that evaluates whether the child thread should be created and can prevent creation of the child thread, if so determined. In still other embodiments, the computer security evaluation code can examine the child thread privileges and can, if so desired, modify the privileges, e.g., access privileges, associated with the child thread.

Thus, in FIG. 6, in one embodiment, following execution of operations 202, 204, 206, 208 and 210 of method 200 (FIG. 2), currently running threads and child threads utilize new system service table 506B rather than original system service table 504 to call at ZwAPI functions using the function address pointers in the stub functions. As earlier described with reference to FIG. 3 and method 300, the remaining function address pointers in the stub functions are now straight function address pointers to ZwAPI functions, rather than signed offsets, e.g., signed offset 512, as found in original system service table 504. ZwAPI functions supported in new system service table 506B can now be hooked by replacing function address pointers of stub functions with hooking code, such as a pointer to the address of alternate code, for example, computer security code, as further illustrated with reference to FIG. 7.

FIG. 7 illustrates a diagram 700 of a new system service table 506C in which a call to a selected ZwAPI function is hooked in accordance with one embodiment of the invention. In FIG. 7, in one embodiment, as earlier described with reference to operation 212 of method 200 (FIG. 2) and method 400 (FIG. 4), a new system service table entry 702 corresponding to a selected ZwAPI function 710 is located in new system service table 506C and the function address pointer (not shown) in the corresponding stub function 704 is replaced with a pointer 706, e.g., "POINTER TO CODE 708", to alternate code 708. Thus, execution of stub function 704 redirects the call to alternate code 708, rather than to ZwAPI function 710 at address 712. In one embodiment, alternate code 708 can optionally release the call to ZwAPI function 710. In some embodiments, alternate code 708 can release and/or modify the call return from ZwAPI function 710. In still other embodiments, alternate code 708 can take other actions with respect to the execution of the call.

In one embodiment, as earlier described with reference to FIG. 4 and method 400, alternate code 708 is computer security code. In some embodiments, alternate code 708 stalls execution of a call to ZwAPI function 710 and performs a computer security evaluation to determine if malicious code activity is detected. If malicious code activity is not detected, alternate code 708 releases the call to ZwAPI function 710. Alternatively, if malicious code activity is detected, alternate code 708 provides a notification to a user, and can in some embodiments, initiate protective actions, such as failing the call.

Thus, in FIG. 7, in one embodiment, following execution of operations 202, 204, 206, 208, 210 and 212 of method 200 (FIG. 2), currently running threads and child threads utilize new system service table 506C rather than original system service table 504 to call at ZwAPI functions using the function address pointers in the stub functions. As the function address pointers in the stub functions are straight function address pointers, rather than signed offsets, applications needing to hook selected ZwAPI functions can store off the corresponding function address pointers and replace them with pointers to alternate code.

Thus in FIG. 7 in one embodiment, alternate code is dynamically inserted between the caller of a ZwAPI function, in user or kernel mode, and the operating system's implementation of the ZwAPI function. The dynamically inserted code has full access to the function parameters, such as arguments. Further, a hook can be removed by replacing the pointer to the alternate code with the stored off function address pointer.

Figure 8:
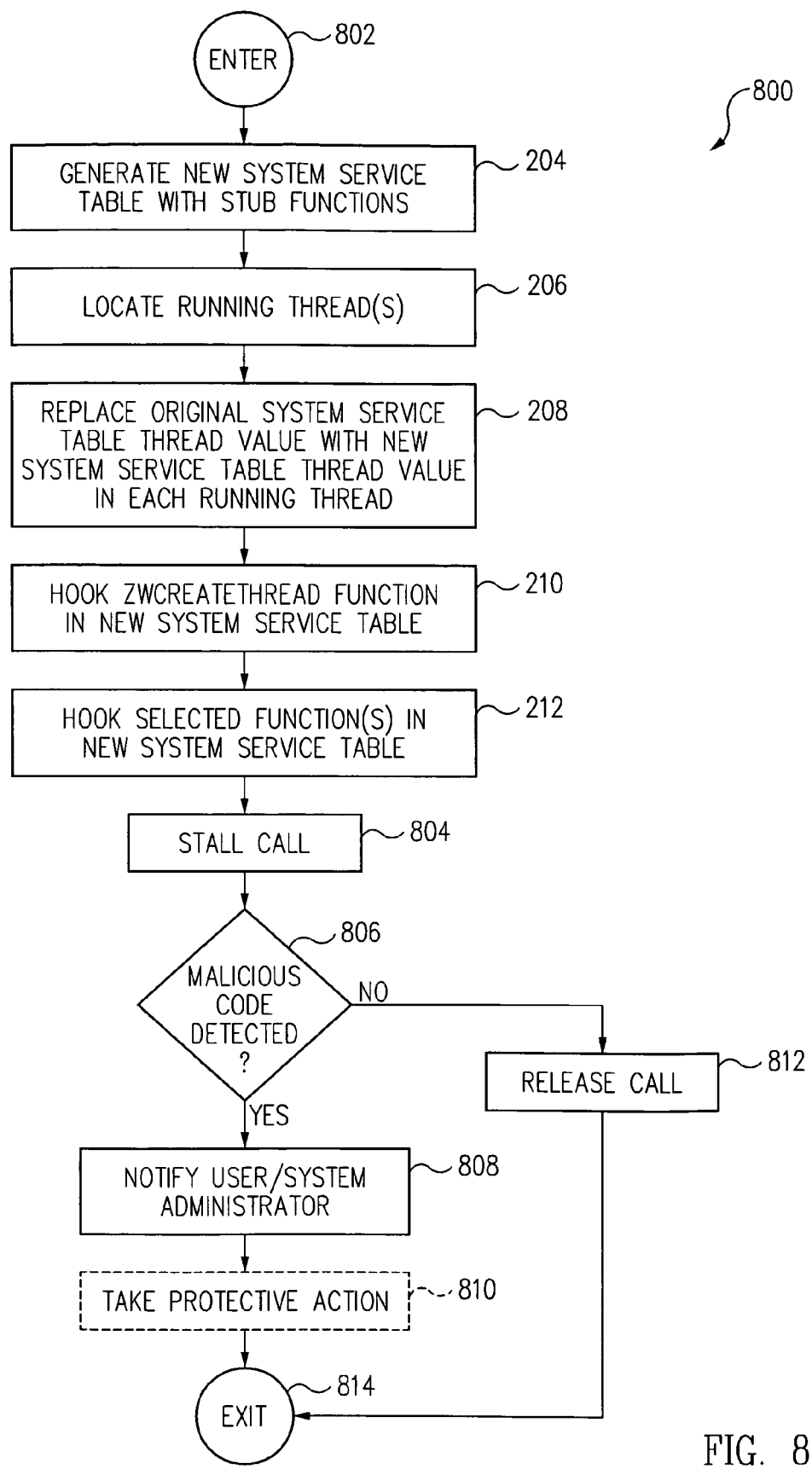
FIG. 8 illustrates a flow diagram of a method for detecting malicious code in which selected native operating system function(s) are hooked by the hooking application of FIG. 1 on an x86-64 bit Windows XP operating system in accordance with one embodiment of the invention.

FIG. 8 illustrates a flow diagram of a method 800 for detecting malicious code in which selected native operating system function(s) are hooked by hooking application 106 on an x86-64 bit Windows XP operating system in accordance with one embodiment of the invention. In one embodiment, the native operating system function(s) are ZwAPI functions, i.e., native operating system functions callable using the ZwAPI. Referring now to FIGS. 2 and 8 together, in one embodiment, execution of detection application 106 by processor 108 results in the operations of host computer method 800 as described below.

From ENTER operation 802 processing transitions to GENERATE NEW SYSTEM SERVICE TABLE WITH STUB FUNCTIONS operation 204. In the present embodiment of method 800, operations 204, 206, 208, 210, and 212 are performed as earlier described with reference to method 200, hereby incorporated by reference.

In HOOK SELECTED FUNCTION(S) IN NEW SYSTEM SERVICE TABLE operation 212 one or more new system service table entries corresponding to one or more selected ZwAPI functions are hooked in the new system service table as earlier described with reference to method 200. In one embodiment, a function address to a selected ZwAPI function in a corresponding stub function of the new system service table is stored off and replaced with hooking code, such as a pointer to the location of alternate code.

In the present embodiment, the alternate code is a computer security program, i.e., computer security code, which performs a check for malicious code. Method 800 waits, for example, in a stand-by mode, until a call to, or other invocation of, a hooked ZwAPI function is originated and redirected to the new system service table. The call is then redirected to the computer security program.

From HOOK SELECTED FUNCTION(S) IN NEW SYSTEM SERVICE TABLE operation 212, processing transitions to a STALL CALL operation 804. In STALL CALL operation 804, a call to, or other invocation of, a hooked ZwAPI function is stalled, i.e., is prevented from reaching the operating system or from being returned. In one embodiment, the call is stalled by the computer security program, e.g., by a hook module of the computer security program.

From STALL CALL operation 804, processing transitions to a MALICIOUS CODE DETECTED check operation 806. In MALICIOUS CODE DETECTED check operation 806, a determination is made by the computer security program whether malicious code is detected. For example, by examining the call parameters.

If malicious code is not detected ("NO"), from MALICIOUS CODE DETECTED check operation 806, processing transitions to a RELEASE CALL operation 812.

In RELEASE CALL operation 812 the call to the ZwAPI function is allowed to proceed to the corresponding function code in memory, or to be returned.

From RELEASE CALL operation 812, processing transitions to an EXIT operation 814 with processing exiting method 800. In some embodiments, rather than exiting method 800 at EXIT operation 814, processing returns to operation 804.

Referring again to MALICIOUS CODE DETECTED check operation 806, alternatively, if malicious code is detected ("YES"), from MALICIOUS CODE DETECTED check operation 806, processing transitions to a NOTIFY operation 808. In NOTIFY operation 808, a user of host computer system 102 and/or a system administrator is notified of malicious code detected on host computer system 102. The user and/or system administrator can be notified using any one of a number of techniques, such as by using a pop up window, by writing to a file, and/or otherwise by logging the event. Further, a notification can be provided to a security center.

From NOTIFY operation 808, processing transitions to an optional TAKE PROTECTIVE ACTION operation 810, or directly to EXIT operation 814, if optional TAKE PROTECTIVE ACTION operation 810 is not performed.

In optional TAKE PROTECTIVE ACTION operation 810, in one embodiment, protective action is taken. In some embodiments, a copy of the call or the call parameters are dumped to a text file, or sent to a user, system administrator, and/or security center. From optional TAKE PROTECTIVE ACTION operation 810, processing transitions to EXIT operation 814 with processing exiting method 800.

Thus, in accordance with various embodiments of the invention, a new system service table is dynamically generated to allow dynamic insertion of code between the caller of a native operating system function, in user or kernel mode, and the operating system's implementation of the native operating system function. The dynamically inserted code has full access to the function parameters, such as arguments. The new system service table has encoded values that are relative to the base address of the new system service table and which include the function addresses of the native operating system functions corresponding to original system service table entries in the original system service table.

Referring again to FIG. 1, hooking application 106 is in computer memory 112. As used herein, a computer memory refers to a volatile memory, a non-volatile memory, or a combination of the two.

Although hooking application 106 is referred to as an application, this is illustrative only. Hooking application 106 should be capable of being called from an application, e.g., a HIDS application, or the operating system, e.g., operating system 104.

In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for host computer and client-server configurations, embodiments of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. Further herein, a means for performing a particular function is accomplished using the appropriate computer-readable code and the related hardware necessary to performing the function.

As illustrated in FIG. 1, this medium may belong to the computer system itself. However, the medium also may be removed from the computer system.

For example, hooking application 106 may be stored in memory 136 that is physically located in a location different from processor 108. Processor 108 should be coupled to memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the functionality described in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the processes as described herein.

In view of this disclosure, the embodiments of the present invention can be implemented in a wide variety of computer system configurations. In addition, the embodiments of the present invention can be stored as different modules in memories of different devices.

For example, hooking application 106 could initially be stored in server computer system 130, and then as necessary, a portion of hooking application 106 could be transferred to host computer system 102 and executed on host computer system 102. Consequently, part of hooking application 106 would be executed on processor 134 of server computer system 130, and another part would be executed on processor 108 of host computer system 102.

In yet another embodiment, hooking application 106 is stored in memory 136 of server computer system 130. Hooking application 106 is transferred over network 126 to memory 112 in host computer system 102. In this embodiment, network interface 138 and I/O interface 110 would include analog modems, digital modems, or a network interface card. If modems are used, network 126 includes a communications network, and hooking application 106 is downloaded via the communications network. In view of this disclosure, those of skill in the art can implement various embodiments of the present invention in a wide-variety of physical hardware configurations using an operating system and computer programming language of interest to the user.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
dynamically generating a new system service table in a computer system,
wherein said new system service table comprises:
one or more new system service table entries, wherein each of said one or more new system service table entries corresponds to a different original system service table entry in an original system service table; and
one or more stub functions, wherein each of said one or more stub functions corresponds to a separate new system service table entry;
locating currently running program threads on said computer system;
replacing an original system service table thread value in each of said currently running program threads with a new system service table thread value, such that said currently running program threads utilize said new system service table to call operating system functions rather than said original system service table;
installing a first hook in said new system service table such that calls from said currently running program threads to an operating system function which creates a child program thread are directed to a thread modification code, wherein said thread modification code replaces said original system service table thread value in said child program thread with said new system service table thread value; and
installing at least a second hook in said new system service table such that a call to an operating system function is directed to an alternate code.

2. The method of claim 1, wherein each of said one or more new system service table entries comprises:
a stack argument count value obtained from a corresponding original system service table entry; and
a stub offset to a corresponding stub function.

3. The method of claim 1, wherein each of said stub functions comprises:
instruction code, said instruction code including a function address of a corresponding operating system function in memory.

4. The method of claim 3, wherein said function address is a straight function address pointer.

5. The method of claim 1, wherein said operating system function which creates a child program thread is a ZwCreateThread function.

6. The method of claim 1, wherein said operating system function is a ZwAPI function.

7. The method of claim 1, wherein said dynamically generating said new system service table comprises:
   determining a size of a memory buffer in which to dynamically allocate said new system service table;
   dynamically allocating said new system service table in memory, wherein said new system service table has a base address;
   locating an original system service table entry in said original system service table, said original system service table entry including at least a stack argument count value and a signed offset;
   determining an address of a stub function;
   extracting said stack argument count value from said original system service table entry;
   determining a stub function offset of said stub function from said base address of said new system service table;
   storing said stack argument count value and said stub function offset as a new system service table entry in said new system service table;
   determining a function address of said operating system function in said memory based on said signed offset; and
   modifying said stub function with said function address.

8. The method of claim 7, further comprising:
   determining if said original system service table entry in said original system service table is a last original system service table entry in said original system service table;
   wherein if said original system service table entry is not said last original system service table entry, said method further comprising:
   locating a next original system service table entry in said original system service table, said next original system service table entry including at least a next stack argument count value and a next signed offset;
   determining a next address of a next stub function;
   extracting said next stack argument count value from said next original system service table entry;
   determining a next stub function offset of said next stub function from said base address of said new system service table;
   storing said next stack argument count value and said next stub function offset as a next new system service table entry in said new system service table;
   determining a next function address of said next operating system function in said memory based on said next signed offset; and
   modifying said next stub function with said next function address.

9. The method of claim 7, wherein said new system service table is allocated in a non-paged pool of memory.

10. The method of claim 7, wherein said stub function further comprises:
    instruction code for causing said operating system function to be called at said function address.

11. The method of claim 7, wherein said determining a function address of said operating system function in said memory based on said signed offset comprises:
    adding said signed offset to a base address of said original system service table.

12. The method of claim 1, wherein said installing a first hook in said new system service table such that calls from said currently running program threads to an operating system function which creates a child program thread are directed to a thread modification code comprises:
    determining a location of a ZwCreateThread service identifier (ID);
    extracting said service identifier (ID) from said ZwCreateThread entry;
    extracting a table identifier (ID) from said service ID;
    extracting a table index from said service ID;
    locating a stub function corresponding to a ZwCreateThread function in said new system service table, said stub function including at least a function address of said ZwCreateThread function in memory;
    storing off said function address; and
    replacing said function address with hooking code, such that calls made to said ZwCreateThread function are redirected to said thread modification code.

13. The method of claim 2, wherein said ZwCreateThread service ID is located using GetNtDll/GetNtOSService Address.

14. The method of claim 1, wherein said replacing an original system service table thread value in each of said currently running program threads with a new system service table thread value comprises:
    for each of said currently running threads, replacing said original system service table thread value in a system service table field of a Kthread block with said new system service table thread value.

15. A method comprising:
    dynamically generating a new system service table in a computer system,
       wherein said new system service table comprises:
          one or more new system service table entries, wherein each of said one or more new system service table entries corresponds to a different original system service table entry in an original system service table; and
          one or more stub functions, wherein each of said one or more stub functions corresponds to a separate new system service table entry;
    locating currently running program threads on said computer system;
    modifying currently running program threads such that said new system service table is used to call a ZwAPI function rather than said original system service table;
    hooking a ZwCreateThread function in said new system service table such that calls to said ZwCreateThread function are directed to thread modification code,
       wherein, the thread modification code calls the ZwCreateThread function and on return replaces the original system service table thread value with the new system service table thread value;
    hooking at least one selected ZwAPI function in said new system service table such that a call to said at least one selected ZwAPI function is directed to alternate code;
    stalling a call to said at least one selected ZwAPI function;
    determining whether malicious code is detected on said computer system;
       wherein upon a determination that said malicious code is detected, providing a notification to a user; and
       wherein upon a determination that said malicious code is not detected, releasing said call to said at least one selected ZwAPI function.

16. The method of claim 15, wherein upon a determination that said malicious code is detected, the method further comprising:

taking protective action with respect to said malicious code.

17. The method of claim 15, further comprising:

modifying child program threads created by said currently running program threads such that said new system service table is used to call ZwAPI functions rather than said original system service table.

18. A computer system comprising:

a memory having stored therein a hooking application; and a processor coupled to said memory, wherein execution of said hooking application generates a method comprising:

dynamically generating a new system service table in a computer system, wherein said new system service table comprises:

one or more new system service table entries, wherein each of said one or more new system service table entries corresponds to a different original system service table entry in an original system service table; and one or more stub functions, wherein each of said one or more stub functions corresponds to a separate new system service table entry;

locating currently running program threads on said computer system;

replacing an original system service table thread value in each of said currently running program threads with a new system service table thread value, such that said currently running program threads utilize said new system service table to call at operating system functions rather than said original system service table;

installing a first hook in said new system service table such that calls from said currently running program threads to an operating system function which creates a child program thread are directed to a thread modification code, wherein said thread modification code replaces said original system service table thread value in said child program thread with said new system service table thread value;

installing at least a second hook in said new system service table such that a call to another operating system function is directed to an alternate code;

stalling a call to said at least one selected ZwAPI function; and determining whether malicious code is detected on said computer system;

wherein upon a determination that said malicious code is detected, providing a notification to a user; and wherein upon a determination that said malicious code is not detected, releasing said call to said at least one selected ZwAPI function.

\* \* \* \* \*

UNITED STATES PATENT AND TRADEMARK OFFICE
CERTIFICATE OF CORRECTION

PATENT NO. : 7,703,081 B1  Page 1 of 1
APPLICATION NO. : 11/234478
DATED : April 20, 2010
INVENTOR(S) : David M. Buches It is certified that error appears in the above-identified patent and that said Letters Patent is hereby corrected as shown below:

In Column 20, Line 20, Claim 13, replace "claim 2" with --claim 12--.

Signed and Sealed this

Twenty-ninth Day of June, 2010

David J. Kappos
*Director of the United States Patent and Trademark Office*